Patented July 5, 1949

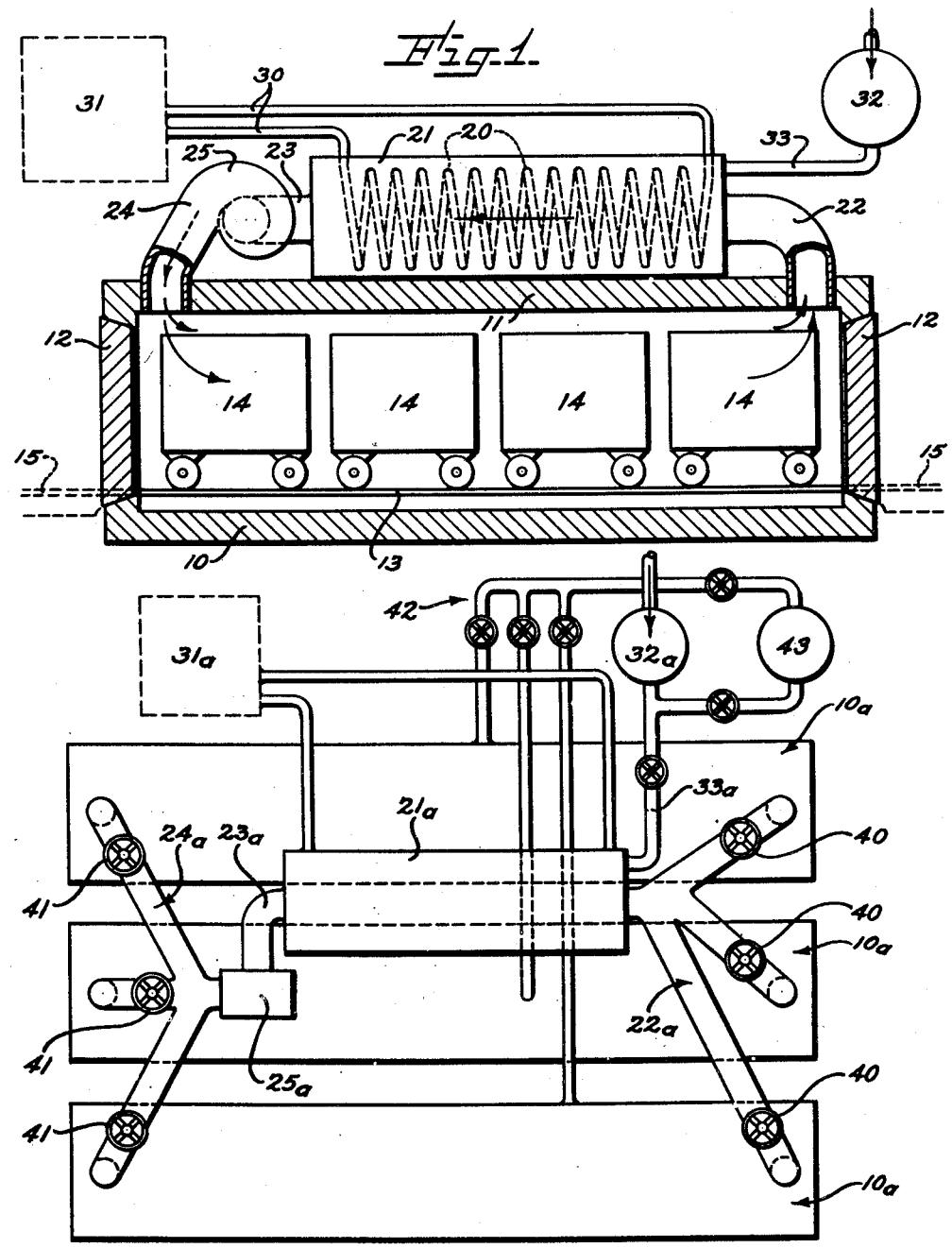

2,475,077

UNITED STATES PATENT OFFICE 2,475,077

QUICK REFRIGERATION SYSTEM

Gilbert E. Clancy, San Bernardino, Calif., assignor to Drayer-Hanson, Los Angeles, Calif., a copartnership Application August 13, 1945, Serial No. 610,492

4 Claims. (Cl. 62—173)

This invention has reference to refrigerating systems, and, more particularly, to pre-cooling or quick freezing systems for vegetable and animal produce. The general purpose and objective is to produce, and thus to decrease the time required for pre-cooling or freezing. My invention accomplishes that objective with a system which does not require additional power for its operation and which requires only relatively minor additions to the apparatus now in usual use.

Systems now used for freezing produce quickly usually employ rapid forced circulation of air over the goods to be frozen. In an installation of any given size, the rate of heat transfer to cool the produce from a given initial temperature to the desired final temperature is dependent mainly on the temperature to which the air is cooled and the volumetric or linear velocity of its flow over the produce. Both of those factors have practical limitations, and the minimum time periods practical with such systems have now been substantially reached. Rapid movement of air over the produce has been used with some degree of success; but the practically useable velocities have been limited to values which do not permit a high rate of heat transfer, because of the large amount of power required for the air moving apparatus, large and bulky ducts, fans and air cooling devices, and because of the possibility of blowing the produce or its containers around by the air blast.

Air, or other suitable gases or vapors, such as carbon dioxide or nitrogen have many advantages as a heat transferring medium in quick refrigerating operations, as they do not contaminate or deteriorate most produce. Liquids, particularly water, have greater heat carrying capacity than gases; but the only practicable liquid, water, which will not contaminate food produce cannot be used for freezing the produce, and in some instances even it does change the water content, the color, flavor or structure of the produce. Air, or such non-contaminating gases as I mention, is free of those objectionable features of water, but, as universally used in the past, has had a comparatively low heat transferring or heat carrying capacity. My invention proposes to utilize air, or other gaseous fluid, with the attendant advantages, but under a super-atmospheric pressure which multiplies the heat carrying capacity per unit volume, increases the rate of heat transfer and decreases the time period of refrigeration proportionately, and at the same time proportionately decreases the amount of dehydration which the produce undergoes during refrigeration.

The rate of heat transmission in an air circulation system varies with the mass velocity of the air over the produce (in most instances it varies as about the 0.8 power of the mass velocity). With the same volumetric velocity the rate of heat transfer will vary as the 0.8 power with the density of the air. By using air at, say, three atmospheres absolute, the rate of heat transfer is multiplied about 2.4 times and the refrigerating time reduced proportionately.

At the same time, the dehydration suffered by the produce is substantially reduced. The maximum amount of water which can be carried off from the produce depends on the volume of air which is circulated over it, everything else being the same; and in my system, the total volume of circulated air being much less than the usual total, the dehydration is correspondingly reduced. Under any given set of conditions, the absolute moisture content of a unit volume of air remains the same regardless of the air density and pressure.

Apparatus for utilizing my system may be of many and various types, depending on all the circumstances. Hence, in the accompanying drawings I merely give diagrammatic illustrations of suitable typical apparatus; Fig. 1, being a vertical sectional diagram of one typical form of apparatus, and Fig. 2 being a diagrammatic plan showing a form employing multiple refrigerating chambers.

Fig. 1 shows illustratively a pressure chamber 10 constructed suitably to sustain an internal pressure of several atmospheres. The walls 11, and the door or doors 12 of the chamber will be suitably heat insulated, and the doors made of such a construction as to be pressure-tight when closed. The chamber for example may be of elongate form with doors at one or both ends and equipped with floor rails 13 onto and from which produce trucks 14 may be rolled to and from external rails 15. The physical relation of the other parts of the apparatus to the chamber will of course depend upon the location and character of the chamber itself. The relations shown in the figures are merely diagrammatically illustrative.

Fig. 1 shows a refrigerating or heat absorbing surface illustratively in the form of a coil 20 in a pressure chamber 21, that chamber being connected at one end with the refrigerating chamber 10 through a suitable conduit 22, and at the other end connected with the other end of the refrigerating chamber through a suitable conduit 23, 24 in which an air circulation fan or impeller 25 is included. The circulation through the chamber can be in any relative orientation, longitudinal circulation being shown here as merely illustrative. The connections between chamber 21 and chamber 10, including the air circulation fan, are all pressure-tight and capable of sustaining the desired or adopted internal pressure. The remainder of the refrigeration system, to which expansion coil 20 is connected by connections 30, is illustrated merely as a diagrammatic block 31. As well understood, this part of the system will include the usual means for compressing and transferring heat from the refrigerating medium.

Assuming that the refrigeration system is in operation and that a charge of produce has been moved into the refrigerating chamber and the doors closed, the pressure in the closed air circulating system may then be brought up to the desired super-atmospheric pressure, say three atmospheres or more, by means of a compressor 32 connected into the closed circulation system at any suitable point, as by being connected by conduit 33 with chamber 21. After having once raised the internal pressure to the desired value, the compressor may then be used to keep the pressure constant if any substantial leakage occurs.

Fan 25 will then be operated to circulate the densified air in a closed circuit, such as illustrated, through the two chambers 21 and 10 and over the produce in chamber 10 at a volumetric velocity which need not be any greater than the volumetric velocity normally used, and might in some cases be less. Assuming that the volumetric and linear velocities are about the same as those normally used (say for instance a linear velocity of about 1000 feet per minute over the produce) the physical size of the various conduits, fan 25, chamber 21 and expansion coil 20 need not be any greater than those parts would be for handling air at atmospheric pressure at the same velocity. A fan of a given size will handle about the same volume of air regardless of its pressure and density. The frictional loss increases directly as the first power of the density at constant linear velocity; and, with the linear velocity kept at a reasonably low figure, as my invention provides, the frictional loss at any density is relatively small. On the other hand if in a system operating at atmospheric pressure the linear and volumetric velocities were increased to circulate the air at the increased mass velocity of my system, the frictional losses would increase as about the 1.8 power of the linear velocity, and the necessary velocity head, and required power, would increase as about the square of the linear velocity.

As pointed out before, the substantially increased rate of heat transfer results in the total time period of refrigeration under any given circumstances being proportionately reduced; and, as also pointed out, the dehydration of the produce is substantially reduced.

Fig. 2 shows diagrammatically a multiple chamber form of apparatus consisting of a battery of three freezing or refrigerating chambers 10a. A single expansion coil chamber 21a is shown as serving the multiple refrigerating chambers 10a. The refrigerating plant is shown in block at 31a and the compressor at 32a.

Chamber 21a is connected at one end with an end of each of the three chambers, through a manifold conduit 22a, each branch of which is controlled by a valve 40. The other end of chamber 21a is connected with fan 25a by the single conduit 23a, and the output of the fan is connected by a manifold 24a with the other ends of the three chambers 10a, each manifold branch being controlled by valve 41.

Fig. 2 is illustrative of a multiple arrangement, consisting of any suitable or desired number of refrigerating chambers, all operated from a common or central refrigeration plant. The arrangement is such that one or more of the multiple chambers may be in the process of charging or discharging while the others are in operation to refrigerate their charges; valves 40 and 41 being manipulated to cut off any chamber or chambers when its doors are open.

The immediately preceding description of a multiple chamber plant is merely illustratively typical. For instance, in such a multiple plant each chamber may preferably have its own individual coils and fan; being in effect, a multiplication of the single unit shown in Fig. 1 with perhaps a common refrigerating plant. However, in any multiple chamber plant it may be advantageous that the preferably common compressor take its air from the chamber or chambers which are to be unloaded, before they are discharged, thus avoiding loss of cold air. Thus, in Fig. 2 I show a valve controlled intake manifold system 42 leading from the several chambers to the compressor intake, and also a tank 43 connected into the compressor output line 33a and valvularly controlled so that the cold air from a chamber may be stored under pressure for further use in the system.

Throughout the foregoing particular description I have referred to air as the heat transferring fluid, but other suitable gases or vapors may be used. I have previously mentioned nitrogen and carbon dioxide. Nitrogen would act about like air itself, since air is about four-fifths nitrogen. However the density of $CO_2$ (about 1.5 times that of air) gives that gas a substantial advantage in heat carrying capacity in spite of the fact that its specific heat is somewhat lower than that of air. Consequently it may be advantageous in some installations to use $CO_2$. However any gaseous fluid which does not contaminate the produce may be used, and of those air seems effective and most convenient.

I claim:

1. The method of preserving animal and vegetable produce, said method comprising the steps of rapidly freezing the produce by circulating a gaseous fluid over a fluid cooling element and over the produce in a freezing chamber, the pressure of said circulated fluid being substantially greater than atmospheric pressure, and removing the produce in frozen condition from the freezing chamber.

2. The method of preserving animal and vegetable produce, said method comprising the steps of rapidly freezing the produce by circulating air over a fluid cooling element and over the produce in a freezing chamber, the pressure of said circulated air being substantially greater than atmospheric pressure, and removing the produce in frozen condition from the freezing chamber.

3. The method of claim 1, and in which the pressure is approximately three atmospheres or more.

4. The method of claim 2, and in which the pressure is approximately three atmospheres or more.

GILBERT E. CLANCY.

REFERENCES CITED

The following references are of record in the file of this patent:

UNITED STATES PATENTS

| Number | Name | Date |
|---|---|---|
| 1,933,257 | Goosmann | Oct. 31, 1933 |
| 2,019,551 | Varney | Nov. 5, 1935 |
| 2,302,169 | Baker | Nov. 17, 1942 |
| 2,345,204 | Lodwig | Mar. 28, 1944 |